United States Patent
Roehling

[11] Patent Number: 6,032,767
[45] Date of Patent: Mar. 7, 2000

[54] DISC BRAKE WITH PARTIAL LINING AND A BRAKE JAW

[75] Inventor: Willmut Roehling, Cologne, Germany

[73] Assignee: Textar GmbH, Leverkusen, Germany

[21] Appl. No.: 08/987,249

[22] Filed: Dec. 9, 1997

[30] Foreign Application Priority Data

Dec. 13, 1996 [EP] European Pat. Off. ............. 96120041

[51] Int. Cl.⁷ ............................ F16D 55/15; F16D 69/00
[52] U.S. Cl. ................ 188/73.1; 188/73.37; 188/250 E; 188/250 G; 188/251 A; 188/250 B
[58] Field of Search ................... 188/73.1, 73.2, 188/250 G, 264 G, 250 E, 73.37, 24.11, 24.22, 251 A, 251 R, 251 M, 71.1, 366, 367, 72.2, 24.16, 264 R, 71.6, 217; 192/107 M, 107 R; D12/180

[56] References Cited

U.S. PATENT DOCUMENTS

| | | | |
|---|---|---|---|
| D. 277,175 | 1/1985 | Caplygih | D12/180 |
| 3,712,428 | 1/1973 | Marsh | 188/251 A |
| 3,860,094 | 1/1975 | Breton | 188/250 B |
| 3,869,024 | 3/1975 | Hauth et al. | 188/72.2 |
| 3,895,693 | 7/1975 | Lucien et al. | 188/71.1 |
| 3,900,083 | 8/1975 | Hauth | 188/72.2 |
| 4,289,216 | 9/1981 | Shirai et al. | 188/73.1 |
| 4,333,550 | 6/1982 | Shirai | 188/73.2 |
| 4,907,677 | 3/1990 | Yamashita et al. | 188/73.1 |
| 4,926,978 | 5/1990 | Shibata et al. | 188/73.1 |
| 5,053,261 | 10/1991 | Nishimura et al. | 188/251 M |
| 5,163,526 | 11/1992 | Morgun et al. | 188/251 M |
| 5,730,259 | 3/1998 | Umezawa | 188/250 G |

FOREIGN PATENT DOCUMENTS

| | | | |
|---|---|---|---|
| 0169998 | 5/1985 | European Pat. Off. | |
| 2734875 | 6/1995 | France | |
| 0224375 | 7/1985 | Germany | 188/250 B |
| 4140220 | 6/1993 | Germany | 188/250 B |
| 2102932 | 4/1990 | Japan | 188/73.1 |

*Primary Examiner*—Douglas C. Butler
*Attorney, Agent, or Firm*—Diller, Ramik & Wight, PC

[57] ABSTRACT

In a brake jaw (5) for disc brakes with partial linings having a brake disc (1), in particular for trucks, comprising a lining support plate (2) and a brake lining (4) fastened to the lining support plate (2), it is provided that for compensation of the radially different heat distribution in the brake disc (1), a radial profiling of the frictional power induced via the brake lining (4) is performed, the profiling being opposite to the heat distribution.

14 Claims, 3 Drawing Sheets

DISC BRAKE WITH PARTIAL LINING AND A BRAKE JAW

BACKGROUND OF THE INVENTION

The present invention refers to a disc brake with partial lining and to a brake jaw.

Disc brakes with partial lining are becoming increasingly common in the construction of trucks. Due to the great weight of trucks, such brakes and brake jaws are exposed to extremely high loads, since the braking power is a multiple of the braking power of common cars.

In disc brake systems used in trucks, fissures often occur in the brake disc that are supposedly due to the shock-like induction of heat when braking at high speeds. Because of the higher circumferential speeds, higher temperatures occur at the outer circumference of the brake disc that go together with different expansions of the brake disc material. On its radially inner side, the brake disc is connected to the brake pot so that a better heat dissipation is achieved there. The different degrees of expansion in different zones of the brake disc cause the brake discs to become warped, for example, into an umbrella-like shape or wave-shaped in the tangential direction, whereby the induction of heat during the braking action becomes even less homogenous. In extreme cases, radially extending fissures occur. If these are continuous from the outer surface through to the inner surface, the brake disc has to be replaced.

SUMMARY OF THE INVENTION

It is an object of the present invention to provide a disc brake with partial lining and a brake jaw, respectively, with which fissures in the brake disc may be avoided even at high thermal stresses on the brake.

Advantageously, the invention provides that for a compensation of the radially differing heat distribution in the brake disc, a radial profiling of the specific frictional power applied via the brake lining is performed that is opposite to the heat distribution.

Advantageously, the present invention allows to make the radial heat distribution in the brake disc uniform and, in particular, to prevent the generation of regions on the brake disc that have different temperatures in the radial direction, respectively. Making the temperature or the temperature gradient more uniform in the radial direction reduces the risk of fissuring. In particular, continuous radially extending fissures are prevented that would require a replacement of the brake disc.

Preferably, the radial profiling of the frictional power applied via the brake lining, which profiling is opposite to the heat distribution in the brake disc, is achieved by adjusting the geometric shape of the brake lining surface. While in known brake linings, the brake lining surface is approximately a circular ring segment shape, the invention provides to reduce the surface area of the brake lining in regions where a local overheating of the brake disc occurs, so as to reduce the frictional power and thereby the induction of heat into the corresponding radial portion of the brake disc.

Alternatively or additionally, the composition of the friction lining material may vary in the radial direction in order to influence the frictional power specific in the radial direction.

In a preferred embodiment, the tangential length of the brake lining decreases continuously outward in the radial direction. With such a brake lining, the specific frictional power is increased on the radially inner side, since the brake pot formed thereto causes a better heat dissipation. Moreover, a higher frictional surface may be provided at this portion since the radius of application of force for the braking moment is smaller. In the central portion of the brake disc, with a somewhat reduced tangential length of the brake lining, the longer lever of application of force induces a greater frictional power that is intended to heat a cooler annular zone on the brake disc to a higher temperature. Finally, the brake lining surface is largely reduced in the outer portion of the brake disc so as to reduce the frictional power and to thereby prevent the generation of a over-heated outer zone of heat on the brake disc.

To reduce the frictional power, the brake lining may have a recess in its radially outer portion. The recess may have various shapes and may also taper radially up to the radially inner edge of the brake lining.

Preferably, the brake lining has a substantially trapezoidal shape, the wider base being situated radially inward.

The composition of the brake lining material may be modified in the radial direction such that the friction value of the brake lining decreases from the radially inner side to the radially outer side. Through the different friction value, one may also influence the frictional power induced into the brake disc.

Further, the brake lining material may have a compressibility varying in the radial direction. For example, the compressibility of the brake lining material may increase radially outward, e.g., the hardness of the brake lining material may decrease from the inner edge to the outer edge, whereby the contact pressure, and thereby the frictional power applied, may be influenced.

In between the brake lining and the lining support plate, a wedge-shaped intermediate layer may be provided, the thickness of which increases radially outward and the compressibility of which is higher than that of the brake lining. Such an intermediate layer advantageously allows for a reduction of the frictional power in the outer regions, by ever decreasing the contact pressure radially outward.

With such a wedge-shaped intermediate layer, the brake lining may have an opposite wedge-shaped design so that the frictional surface extends in parallel to the lining support plate.

A further way of influencing the contact pressure and, thus, the applied frictional power is to provide the lining support plate or the brake lining with a thickness decreasing radially outward.

BRIEF DESCRIPTION OF THE DRAWINGS

The following is a detailed description of embodiments of the present invention in conjunction with the accompanying drawings.

In the Figures.

DETAILED DESCRIPTION OF PREFERRED EMBODIMENTS

Figure 1:
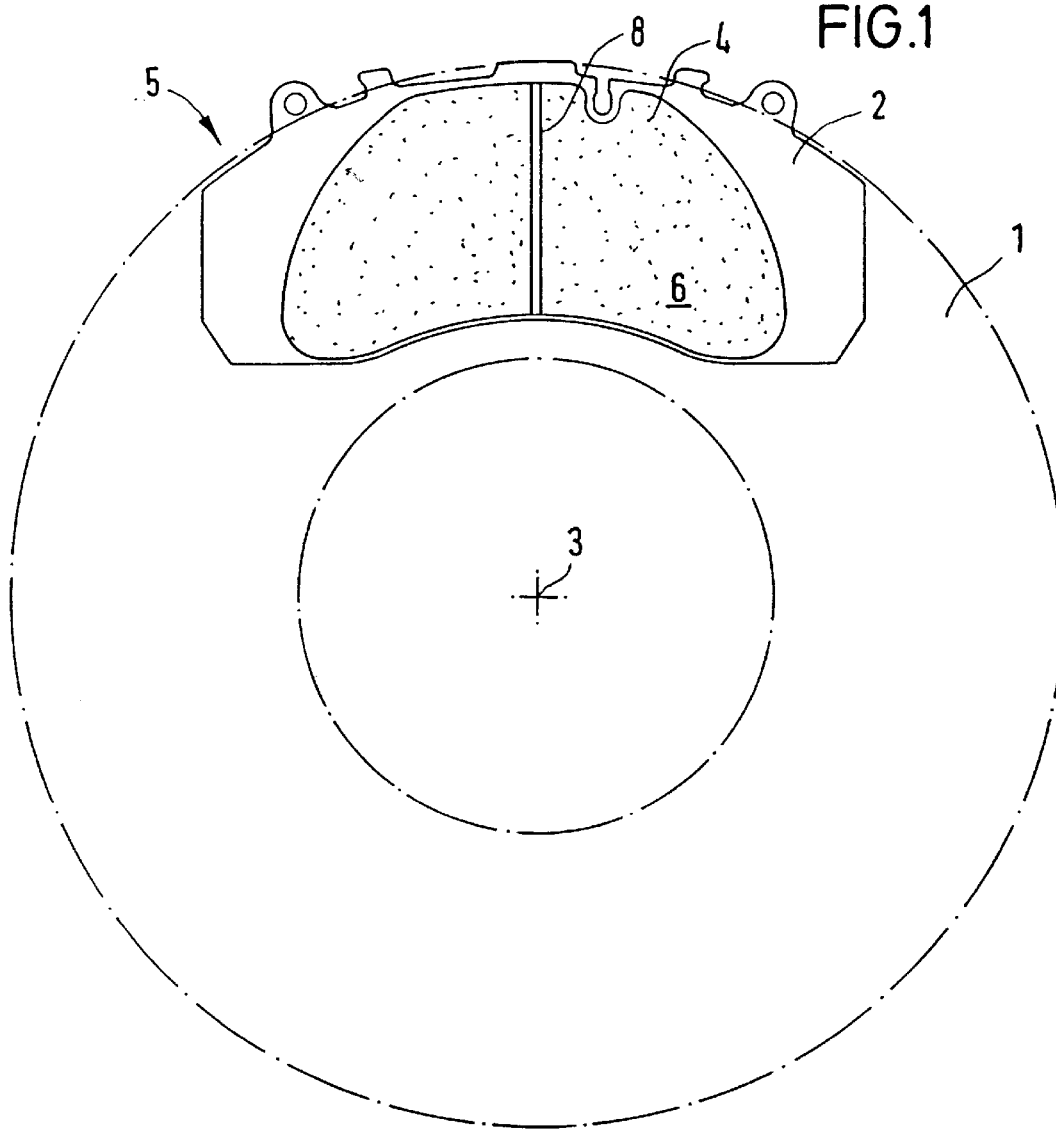
FIG. 1 shows a top plan view of a brake jaw and a brake disc of a disc brake with partial lining.

In a disc brake with partial lining according to FIG. 1, the rotating part is a brake disc 1 adapted to be braked by two stationary opposing brake jaws 5. The brake jaws 5 are pressed against the brake disc 1 by a pneumatic brake system known per se. Each brake disc 5 consists of a brake lining 4 made of friction material and a lining support plate 2 to which the brake lining 4 is fastened.

FIG. 1 shows a lining support plate 2 and is part of a common disc brake with partial lining used for trucks.

Figure 2:
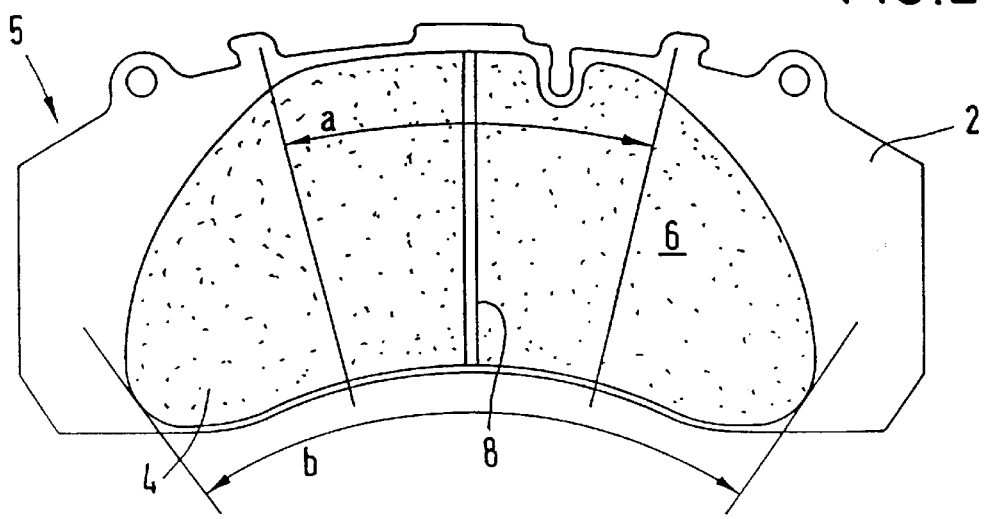
FIG. 2 illustrates a first embodiment of a brake jaw.

As illustrated in FIG. 2, the geometry of the brake lining 4 is modified such that the brake lining surface 6 decreases continuously in the radial direction. In its radial line of symmetry, the brake lining 4 is divided by a slit 8.

The brake lining surface 6 comprises a segment-shaped section a and adjacent sections on both sides thereof, the surface of which decreases radially outward. The ratio between the segments a and b is approximately 1:2 to 1:3.

Figure 3:
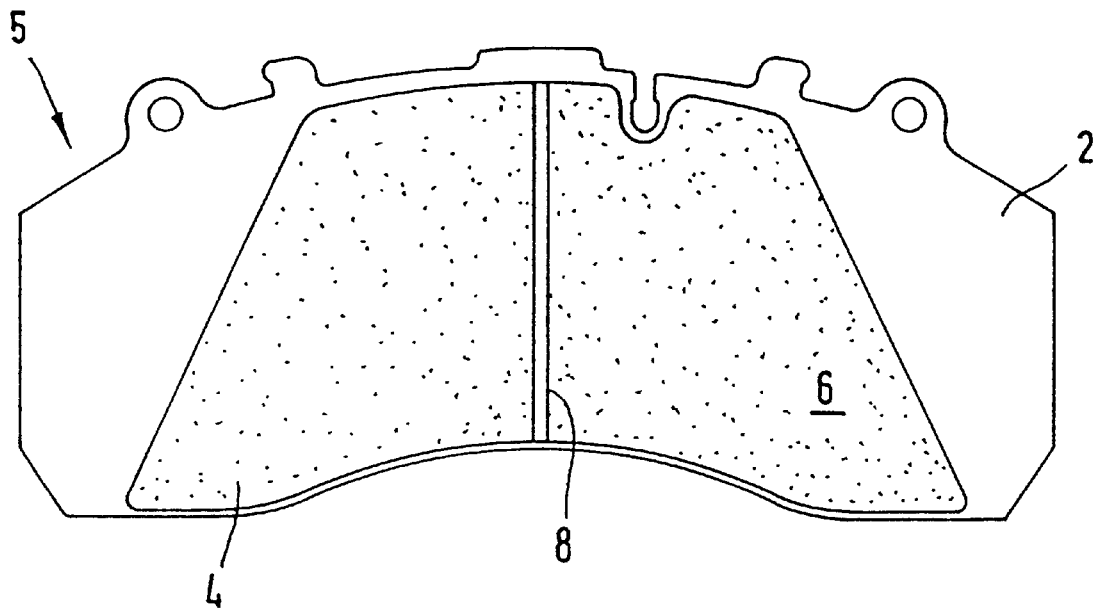
FIG. 3 shows a second embodiment of a brake jaw.

FIG. 3 illustrates a second embodiment of the brake lining 4 with a substantially trapezoidal brake lining surface 6, wherein the tangential length of the brake lining also continuously decreases radially outward.

Figure 4:
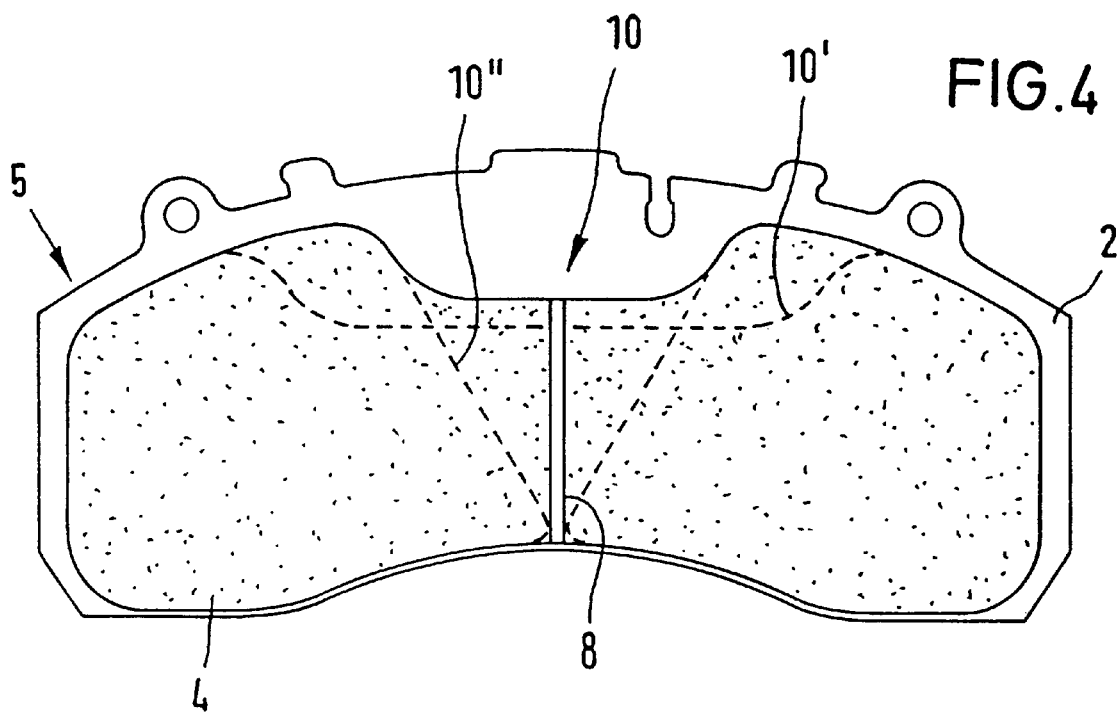
FIG. 4 illustrates a third embodiment of a brake jaw.

Finally, FIG. 4 illustrates a third embodiment of a brake lining 4 having a substantially conventional basic shape, wherein, however, the brake lining surface has a recess 10, 10', 10" such that the brake lining surface is reduced at least in the radial outer portion or continuously decreases radially outward.

The brake lining geometry of the brake lining surface 6 according to the embodiment of FIG. 2 has shown the best results in braking tests, wherein 500 continuous braking operations were possible without any throughgoing fissures occurring. Heat pictures of the brake disc 1 showed that the heating up may be made uniform by the modified geometry of the brake lining surface, whereby differences in the expansion of the brake disc 1 are minimized. Further, the heat pictures show that the peak temperature load of the outer portion of the brake disc can be reduced substantially.

The generation of heat zones in the brake disc that are heated up differently in the radial direction may be compensated, or at least be made more uniform, by providing different frictional powers. The risk of fissuring is thus reduced substantially, whereby radial throughgoing fissures are prevented in particular.

Alternative to or in addition to influencing the frictional power by the modified geometry of the brake lining surface, the frictional power may be influenced by the frictional material having a modified composition in the radial direction, by the frictional material having a modified densification in the radial direction, or by the contact pressure decreasing in the radial direction of the brake lining 4. For example, it is possible to add friction material components increasing the friction value to the mixture in certain portions of the brake lining surface 4 in order to increase the frictional power.

Figure 5:
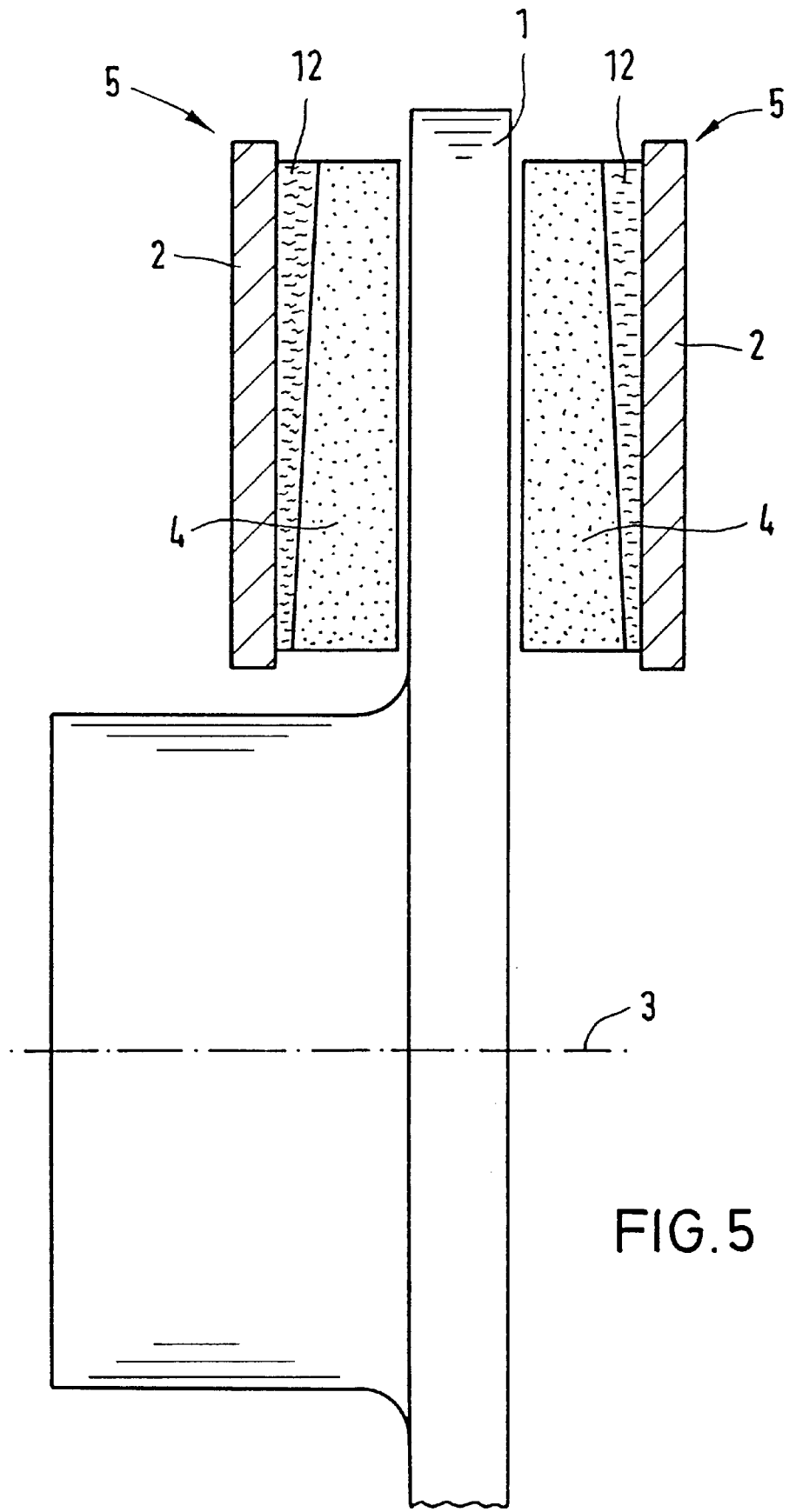
FIG. 5 illustrates a side elevational view of brake jaws and a brake disc of a disc brake with partial lining.

FIG. 5 illustrates an embodiment of a disc brake with partial lining and a brake jaw 5, respectively, wherein, between the brake lining 4 and the lining support plate 2, an intermediate layer 12 is arranged, the thickness of which increases radially outward in a wedge-like manner and which intermediate layer is much more compressible than the brake lining, e.g. by the factor 2. The increased compressibility causes the contact pressure of the brake jaw 5 to continuously decrease radially outward, whereby a reduced frictional power may be induced into the outer portion of the brake disc 1.

I claim:

1. A brake jaw for disc brakes having partial linings comprising a brake lining support plate (2) and a brake lining (4), means (12) between the brake lining (4) and the brake lining support plate (2) for compensating for radially different heat distribution in an associated brake disc during braking, said compensating means (12) being a wedge-shaped intermediate layer (12) located between the brake lining (4) and the brake lining support plate (2), the wedge-shaped intermediate layer (12) having a thickness increasing radially outwardly and having a compressibility substantially greater than the compressibility of the brake lining (4), and the brake lining (4) being of a wedge-shaped configuration with the thickness thereof decreasing radially outwardly such that a brake lining surface (6) of the brake lining (4) is substantially parallel to a surface of the brake lining support plate (2).

2. The brake jaw as defined in claim 1 wherein radial profiling of the frictional power induced into an associated brake disc through the brake lining (4) is effected by one of a radially different composition of the brake lining material and by radially different physical properties of the brake lining material.

3. The brake jaw as defined in claim 2 wherein the brake lining material has a different compressibility in the radial direction.

4. The brake jaw as defined in claim 1 wherein the brake lining (4) includes a recess (10) in the radially outer portion thereof.

5. The brake jaw as defined in claim 1 wherein the composition of the brake lining material has different frictional values in the radial direction.

6. A brake jaw for disc brakes having partial linings comprising a brake lining support plate (2) and a brake lining (4), means (12) between the brake lining (4) and the brake lining support plate (2) for compensating for radially different heat distribution in an associated brake disc during braking, said compensating means (12) being a wedge-shaped intermediate layer (12) located between the brake lining (4) and the brake lining support plate (2), the wedge-shaped intermediate layer (12) having a thickness increasing radially outwardly and having a compressibility substantially greater than the compressibility of the brake lining (4), and the brake lining (4) including a tangential length which continuously decreases radially outwardly.

7. A brake jaw for disc brakes having partial linings comprising a brake lining support plate (2) and a brake lining (4), means (12) between the brake lining (4) and the brake lining support plate (2) for compensating for radially different heat distribution in an associated brake disc during braking, said compensating means (12) being a wedge-shaped intermediate layer (12) located between the brake lining (4) and the brake lining support plate (2), the wedge-shaped intermediate layer (12) having a thickness increasing radially outwardly and having a compressibility substantially greater than the compressibility of the brake lining (4), and the brake lining (4) being substantially trapezoidal in shape with a wider base thereof being located on a radially inner side.

8. A disc brake with a partial lining adapted for use in trucks comprising a brake disc (1) adapted for rotating about a substantially horizontal axis (3), a pair of brake jaws (5) arranged one on each side of opposite sides of said brake disc (1) and bearing against the same during braking, each brake jaw (5) including a brake lining support plate (2) and a brake lining (4), means (12) for compensation for radially different heat distribution in the brake disc (1) during braking, said compensating means (12) being a wedge-shaped intermediate layer (12) located between the brake lining (4) and the brake lining support plate (2), the wedge-shaped intermediate layer (12) having a thickness increasing radially outwardly and having a compressibility substantially greater than the compressability of the brake lining (4), and the brake lining (4) being of a wedge-shaped configuration with the thickness thereof decreasing radially outwardly such that a brake lining surface (6) of the brake lining (4) is substantially parallel to a surface of the brake lining support plate (2).

9. The disc brake as defined in claim 8 wherein the radial profiling of the frictional power induced into said brake disc (1) through the brake lining (4) is effected by one of a radially different composition of the brake lining material and by radially different physical properties of the brake lining material.

10. The disc brake as defined in claim 9 wherein the composition of the brake lining material has different frictional values in the radial direction.

11. The disc brake as defined in claim 9 wherein the brake lining material has a different compressibility in the radial direction.

12. The disc brake as defined in claim 8 wherein the brake lining (4) has a recess (10) in the radially outer portion thereof.

13. A disc brake with a partial lining adapted for use in trucks comprising a brake disc (1) adapted for rotating about a substantially horizontal axis (3), a pair of brake jaws (5) arranged one on each side of opposite sides of said brake disc (1) and bearing against the same during braking, each brake jaw (5) including a brake lining support plate (2) and a brake lining (4), means (12) for compensation for radially different heat distribution in the brake disc (1) during braking, said compensating means (12) being a wedge-shaped intermediate layer (12) located between the brake lining (4) and the brake lining support plate (2), the wedge-shaped intermediate layer (12) having a thickness increasing radially outwardly and having a compressibility substantially greater than the compressability of the brake lining (4), and the brake lining (4) including a tangential length which continuously decreases radially outwardly.

14. A disc brake with a partial lining adapted for use in trucks comprising a brake disc (1) adapted for rotating about a substantially horizontal axis (3), a pair of brake jaws (5) arranged one on each side of opposite sides of said brake disc (1) and bearing against the same during braking, each brake jaw (5) including a brake lining support plate (2) and a brake lining (4), means (12) for compensation for radially different heat distribution in the brake disc (1) during braking, said compensating means (12) being a wedge-shared intermediate layer (12) located between the brake lining (4) and the brake lining support plate (2), the wedge-shaped intermediate layer (12) having a thickness increasing radially outwardly and having a compressibility substantially greater than the compressability of the brake lining (4), and the brake lining (4) being substantially trapezoidal in shape with a wider base thereof being located on a radially inner side.

* * * * *